Feb. 17, 1959   G. X. LENS   2,873,863
INDEXING MECHANISM FOR MECHANICAL CODE RECORDERS
Filed Oct. 3, 1957   7 Sheets-Sheet 1

FIG. 1.

Inventor
G. X. Lens
By
Attorney

Feb. 17, 1959 — G. X. LENS — 2,873,863
INDEXING MECHANISM FOR MECHANICAL CODE RECORDERS
Filed Oct. 3, 1957 — 7 Sheets-Sheet 2

FIG. 2.

Inventor
G. X. Lens
By
Attorney

INDEXING MECHANISM FOR MECHANICAL CODE RECORDERS

Georges Xavier Lens, Antwerp, Belgium, assignor to International Standard Electric Corporation, New York, N. Y., a corporation of Delaware Application October 3, 1957, Serial No. 688,066

Claims priority, application Belgium October 27, 1956

9 Claims. (Cl. 214—11)

The invention relates to an indexing mechanism for mechanical code recorders suitable for controlling a sorting machine.

There is described in my copending patent application, Serial No. 528,012, filed August 12, 1955, now Patent No. 2,807,376, a mechanical recorder of this type, as well as an indexing mechanism consisting of means permitting the displacement of a roller in the conveying path of the upper end of a bar being part of the recorder and placed perpendicularly to the direction of advancement, the recorders being mounted on an endless conveyor. By meeting the roller placed in its operated position, a bar carried by the recorder continues to advance under the action of the conveyor, but is forced to be displaced inside the recorder due to the pressure of the roller, against the action of a restoring spring individual to the bar which thus reaches an operated position.

In article sorting, articles are deposited in conveying receptacles carried by an endless chain and are deposited at a particular destination receptacle along the path of the chain.

In the case of sorting machines such as that described in my U. S. Patent No. 2,689,657, several inputs to the machine, i. e., several operators' positions in case the machine is used by operators, can be provided. In these circumstances the individual carriers or article receptacles are mounted on an endless conveyor, and convey the objects delivered to the inputs thereof to their respective destinations, and are used by various operators. The carriers are spacedly mounted on the conveyor chain, but considering the moment when a given carrier receives an object coming from a first operator's position, the following carrier or carriers are not used by the same operator's position. It is only after a number of carriers equal to the number of operators' positions minus one that the next carrier will be available for the operator's position considered. In other words, the carriers temporarily corresponding to the various operators' positions are interlaced. As described in my said copending application, the code recorders may either be directly connected to a corresponding carrier, or they may be mounted on an auxiliary endless conveyor which can thus operate at a more reduced speed but in synchronism with the main conveyor.

This is possible because the dimensions of the recorder are smaller than those of the carriers when the apparatus is used for mail sorting for instance. In both cases, namely whether the code recorders are directly carried by the article conveyor or on an auxiliary conveyor, the records are interlaced in the same manner as the article carriers. The speed of advancement of the conveyors is, in general, determined by mechanical considerations and is limited by mechanical vibration. High speed operation increases substantially the rate of wear of the mechanism or creates a high level of noise. An acceptable speed of advancement will be the speed of sorting which will determine the spacing between the elements, i. e., the individual carriers in case of the main conveyor and the code recorders in case of the auxiliary conveyor. For instance, if the latter advances at a maximum speed of twenty centimeters per second and if it is desired to be able to sort letters at a maximum speed of one per second per operator, the spacing between the recorders temporarily allocated to a particular operator's position will be twenty centimeters. In view of the preceding considerations, if several operators' positions are provided, four for instance, it will be necessary to have a distance of five centimeters between a code recorder and the next one on the auxiliary conveyor. It is thus seen that there is an advantage in limiting the dimensions of the recorders if it is desired to limit the speed of advancement for a given sorting speed. But a particular problem is met where the sorter utilizes a plurality of operators' positions. Instead of the time of one second mentioned above as example, or at least a fraction of this time, being available to the operator to impress the code on a recorder, the time available will be substantially divided by the number of operators' positions. Indeed, as soon as the operation of a recorder has been accomplished, the operating device must be restored to its normal position and this rapidly in order to avoid the incorrect operation of the recorder which follows immediately the one which has just been operated. For the example chosen above and with four operators, there will normally remain to the latter less than a quarter of a second to impress the code, and a dead time of more than three-quarters of a second. Such a limitation becomes too severe, not only for the mechanisms which have to function at an increased speed but also for the operator who can no longer operate at full efficiency, i. e., the sorting speeds would become much smaller. Consequently, the prior art utilizes electrical code recorders operated from keyboards used by operators and which permit the registration of the code during the minimum time allowed. Such an arrangement constitutes part of the Belgian Patent No. 501,687 where no mechanical registers are utilized. But, although being relatively complex, the eventual use of such a device to cooperate with the mechanical recorders would not solve the problem of the very fast operation and release of the recording mechanisms.

An object of the invention is to provide a sturdy and simple mechanical solution to the problems defined above.

According to a characteristic of the invention, an indexing mechanism is provided for mechanical code recorders, of which a plurality are mounted on an endless conveyor, the codes being mechanically recorded from a fixed mechanism and used to control a sorting machine and particularly a multi-input machine so that recorders corresponding to the various inputs are regularly spaced and interlaced in such a way that the distance between a recorder receiving information from a particular input and the next one which also receives information from the same input is equal to the distance between a recorder and the next one, multiplied by the number of inputs, is characterized by the fact, that an intermediate endless conveyor is interposed at each input between the fixed mechanism recording the code and the main conveyor, this intermediate conveyor being provided with one or various intermediate recorders, regularly spaced, which record the code of the fixed mechanism to transfer it to the recorders of the main conveyor, the auxiliary conveyor being synchronized with the main conveyor, and this auxiliary conveyor permitting the fixed mechanism to record a given code during a time substantially independent of the number of inputs.

The abovementioned and other objects and features of the invention will become more apparent and the invention will be best understood by referring to the following description of an embodiment taken in conjunction with the accompanying drawing, in which.

Figure 1:
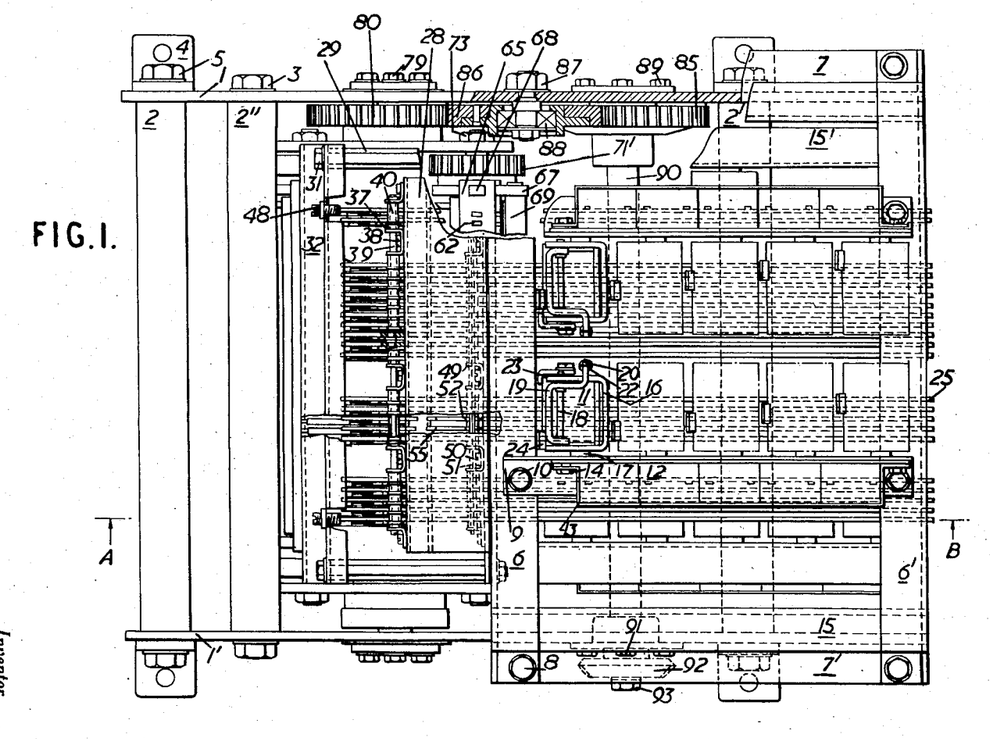
Fig. 1 represents a plan view partly in section of the indexing mechanism according to the invention.
Figure 2:
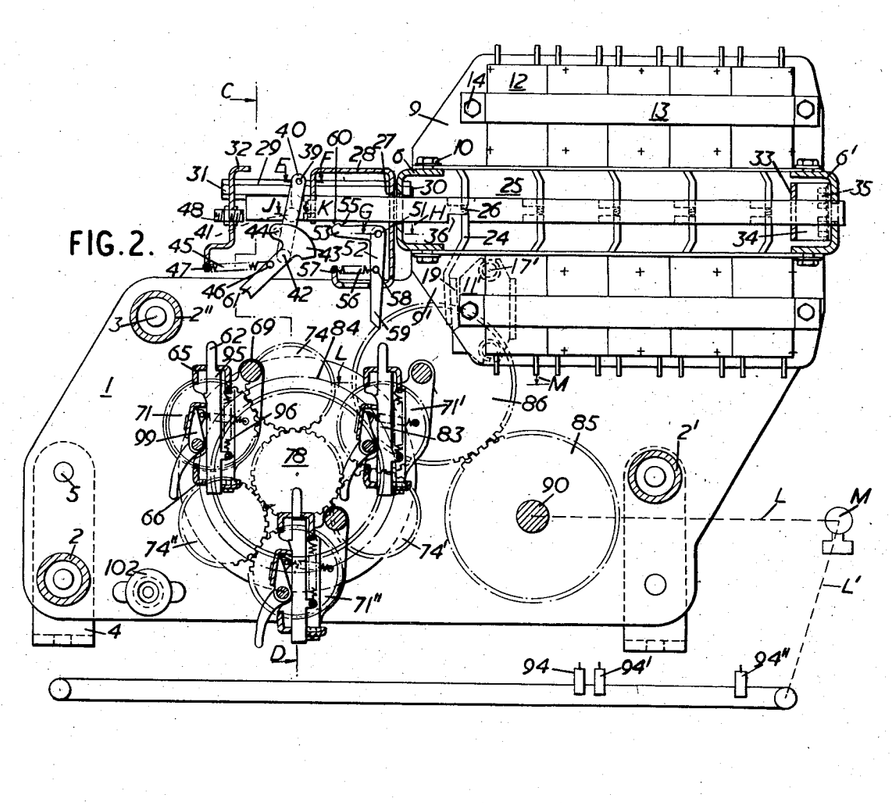
Fig. 2 represents a longitudinal sectional view of this same mechanism according to a vertical plane parallel to the direction of advancement of the recorders.
Figure 3:
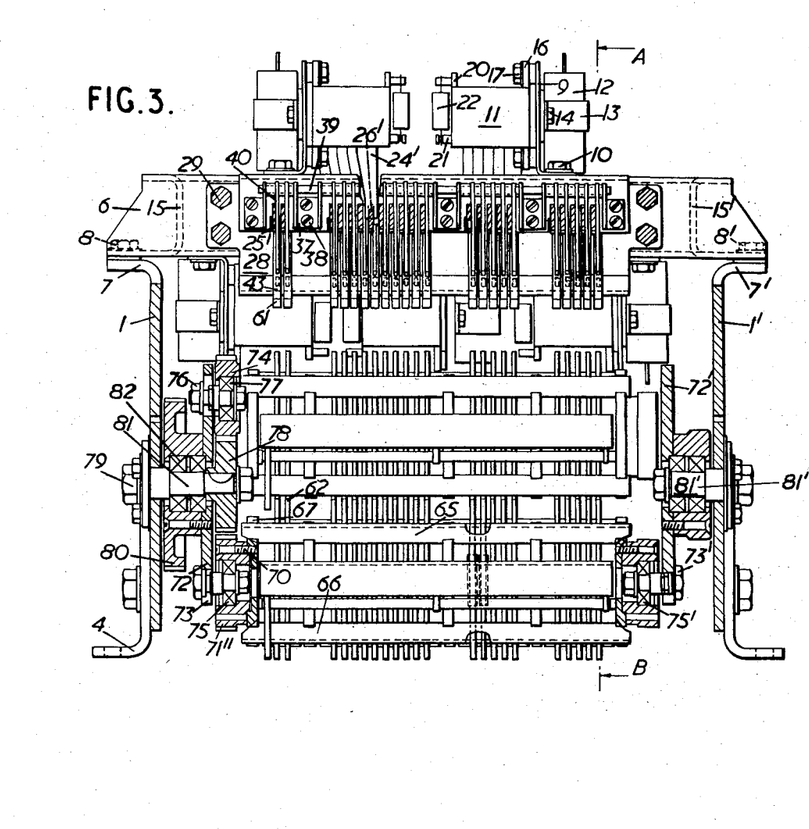
Fig. 3 represents a transverse sectional view of this same mechanism according to a vertical plane perpendicular to the direction of advancement of the recorders.

Referring to Fig. 1, line A—B indicates the plane of Fig. 2, this line A—B being also represented at Fig. 3. Referring to Fig. 2, the lines ending in C and D indicate the section planes represented at Fig. 3. Four partial cutaways have been made at Fig. 1, according to the partial sections E—F, G—H, J—K and L—M.

It is to be noted that Fig. 2 illustrates the following description of the mechanism, Figs. 1 and 3 being however helpful to indicate the relative position of the various parts of the mechanism, whereas Figs. 4 to 7 permit one to follow the various stages of an operation cycle bringing the intermediate recorders on the one hand in relation with the fixed indexing mechanism, and on the other hand with the main recorders being displaced on their conveyors.

Referring now to Fig. 1, there is shown a plan view of my novel indexing mechanism which consists of a fixed mounting frame having two vertical spaced plates 1 and 1' which are united by tubular tie-bars 2, 2' and 2'' fixed between the sides of the plates 1 and 1' by means of bolts 3 which extend through the bars and the plates. The latter also serve to maintain the four mounting brackets 4 for the mounting of the structure on a horizontal base plate (not shown) and located on the outside of the vertical plates 1, 1', and this by means of extra long bolts 5. At their upper parts, the vertical plates 1, 1' carry two U-shaped crosspieces 6, 6' which rest respectively on the edges 7 and 7' of the vertical plates 1 and 1', these edges extending in a plane normal to the plane of the sides 1, 1' and the fixing of crosspieces 6, 6' is done by means of bolts 8.

Crosspieces, 6, 6', which are interconnected by means of crosspieces 15, 15', to which they are perpendicular, are used to support two pairs of L-shaped longitudinal crosspieces 9, 9' respectively arranged above and below the crosspieces, 6 and 6', the longitudinal crosspieces being fixed to the crosspieces 6 and 6' by means of bolts 10.

The longitudinal crosspieces 9, 9' are used to permit the mounting of a series of electromagnets 11, 11', the electromagnet 11 being one of the five fixed on the longitudinal crosspiece 9 above the crosspieces 6, 6' as represented on Fig. 1, whereas the electromagnet 11', is one of those fixed on the longitudinal crosspiece 9' situated below crosspieces 6, 6' as indicated on Fig. 2. The same longitudinal crosspieces 9, 9' also serve to support condensers 12 represented on Figs. 1, 2 and 3. As indicated on these figures, these condensers are fixed to the vertical wall of longitudinal crosspiece 9 by means of a metallic strap 13 surrounding a series of five condensers 12 and fixed to the upward part of the wall of longitudinal crosspiece 9 on both sides of the set of five condensers by means of bolts 14. These condensers 12 are spark suppressors associated with the circuits of the electromagnets 11.

Frame 16 of electromagnet 11 is fixed to the longitudinal crosspiece 9 by means of two bolts 17, as seen best in Fig. 3. On this frame a pivot 18 is provided around which the armature 19, having the shape indicated on the various figures, can pivot. End 20 of this armature is joined to a fixed pivot 21 by means of the restoring spring of armature 22. Under the action of this spring 22, armature 19 normally abuts against the fixed piece 23. A vertical extension 24 of the armature cooperates with the corresponding control bar such as 25. This cooperation can be easily followed from Figs. 2 and 3 where it is seen that the extension 24 of the armature is provided at its free end with a slot 26 in which the control bar 25 can engage. As indicated on the various figures, the electromagnets 11 are successively aligned along the length of the control bars 25 which they control. The extensions 24 of the armatures are staggered so that each can cooperate with a particular control bar.

The control bars 25 are guided on the one hand in a slot 27 provided in the supporting part 28 of which the section has substantially a U-shaped form as indicated on Fig. 2 and which extends in a direction parallel to the direction of alignment of the various control bars 25. The common support 28 is thus parallel to the crosspiece 6, and these two parts are fixed back to back by means of hexagonal rods 29. These hexagonal rods 29 are fixed at one end to the crosspieces 6 and 28 by means of bolts 30, and to the auxiliary crosspiece 32 by a bolt 31. The auxiliary crosspiece 32 is parallel to the crosspieces 6 and 28 and has a cross-section as indicated at Fig. 2. Further, the control bars 25 are also guided in slots such as 33 which are made in a transverse support 34 having the shape indicated at Fig. 2 and which is parallel to the crosspiece 6' to the inside of which it is fixed by means of bolts such as 35.

Slot 26 provided at the end of extension 24 of the armature of the electromagnet encloses control bar 25, a corresponding notch 36 having been made in the latter to permit the release of the electromagnet when its armature will have been energized. Indeed, upon the energization of the electromagnet, extension 24 of the armature will be displaced to the right (Fig. 2) to cause its control bar 25 to slide in its supports. As will be described later, the control bar will then be retained in its operated position independently of the action of the electromagnet 11 which can release, end 24 of the armature being movable within slot 36.

On the crosspiece 28 fixed to the main crosspiece 6 are mounted U-shaped supports such as 37 fixed by means of screws such as 38 and intended to maintain a transverse axle 39 around which levers 40 can pivot. Each lever 40 carries a pin 41 which engages in a corresponding notch made in control bars 25. The other end of lever 40 carries an axle 42 around which a second lever 43 having the shape indicated on Fig. 2 can pivot. On lever 43 a pin 44 is provided which in normal position abuts against the left-hand edge of the first lever 40 as shown in Fig. 2 under the action of a restoring spring 45. Spring 45 is fixed at 46 to the second lever 43 and at 47 to the auxiliary crosspiece 32.

Considering Fig. 2, the restoring spring 45 thus tends to pull the control bar 25 towards the left against the adjustable stop represented by screw 48 which extends through crosspiece 32. The inoperative position of bar 25 is defined by the abutment thereof against stop 48. On the other hand, on crosspiece 28, but on the side of the crosspiece 6, supports 49 are fixed by means of screws 50 as shown in Fig. 1. An axle 51 is engaged in these supports 49 and on this axle pivots bell crankshaped holding dogs 52. The free end of horizontal arm 53 of the dog is provided with a latching portion 55 which normally abuts against the lower edge of the control bar 25 under the action of a restoring spring 56 coupled between aperture 57 in the crosspiece 28 and on the other hand at 58 being a point on the vertical arm 59 of the dog 52. As soon as the control bar 25 has been displaced towards the right under the action of its associated electromagnet, a tooth 60 extending downwardly from the bottom of the control bar 25 will be held by latching portion 55 of the dog 52, thereafter allowing the release of the associated electromagnet.

Figure 4:
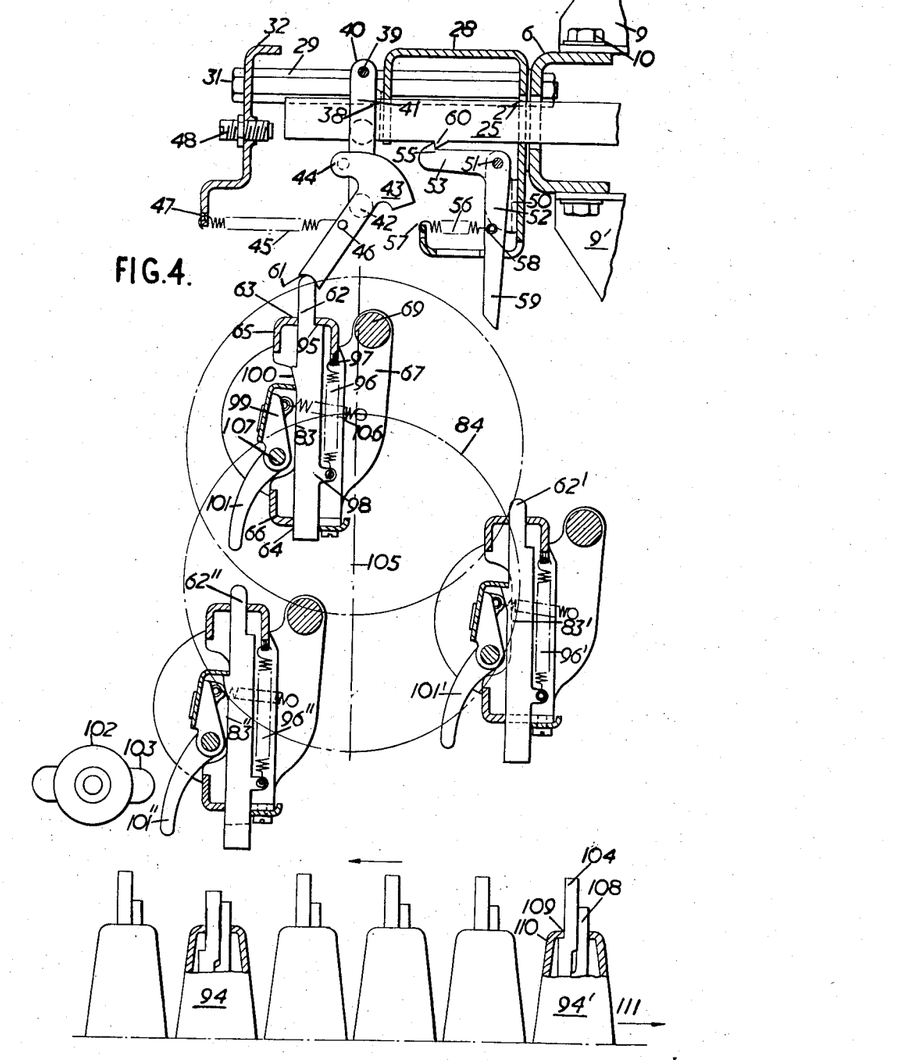
Fig. 4 represents a partial view of Fig. 3 showing an intermediate recorder at the moment when it is engaged with the fixed operating mechanism which is in the operated position.

In its displacement toward the right by its associated electromagnet, the control bar 25 causes the counter-clockwise rotation of the first lever 40, so that the latter is in a substantially vertical position such as represented at Fig. 4. At this moment, a notch 61 of suitable shape provided in the lower end of the second lever 43 is also displaced towards the right and is thereby situated in the path of the upper part of the recording bars 62 located on the intermediate recorders of which there are three, as indicated on Fig. 2 as well as on Figs. 4 to 7. These intermediate recorders are similar to the main recorders such as described in my said copending application. But, instead of using recording and selecting bars, only the former are necessary. The auxiliary recorder includes of course, as many recording bars 62 as there are control bars 25. Figs. 1 and 3 show 5+5+10+2=22 control bars divided into four groups, each code combination consisting in operating a control bar in each group, the arrangement thus permitting 5×5×10×2=500 different code combinations. A code combination obtained by the temporary operation of the four electromagnets is thus translated by the displacement of four corresponding control bars, and four recording bars such as 62 will also be operated at the moment they reach levers 43 in the operative position.

As will be explained hereafter, these bars 62 will always remain in a vertical position but can slide in slots 63 and 64 respectively made in the upper frame 65 and the lower frame 66 of the intermediate recorder, these frames extending transversely of the bars 62. As shown in Fig. 4, the upper and lower frames 65 and 66 are joined by means of lateral walls such as 67 fixed in the openings such as 68 (Fig. 1) provided at the ends of the two horizontal frames. In order to better ensure the rigidity of the assembly, these lateral walls such as 67 are united by means of a tubular crosspiece 69. The lateral sides 67 are fixed by means of screws 70 (Fig. 3) to a gear wheel 71 of which they form an integral part. As is shown particularly on Fig. 3, this gear 71 is fastened to disc 72, in a notch on its circumference, by means of bolts 73 but the gear can turn freely around its pivot by means of bearings such as 75. This wheel cooperates (Fig. 3) with a planetary gear wheel 74 which is also fixed to disc 72 by means of an arrangement comprising bolts 76 and bearings 77. As is shown on Figs. 2 and 3, the planetary gear 74 cooperates with a central gear wheel 78 which is non-rotatably fixed to the vertical wall 1 of the frame by means of bolts 79. On the other hand, disc 72 on which three gear wheels 71 are spacedly mounted and three planetary wheels are integral with a gear wheel 80 which rotates at the required speed around pivot 81 by means of bearings 82.

Referring particularly to Fig. 2, it is seen that the arrangement consisting of the fixed central wheel 78 and the pair of wheels 71 and 74 constitute an epicyclic gear train. Moreover, taking care that the number of teeth of wheel 78 is exactly equal to the number of teeth of wheel 71 independently of the number of teeth of the planetary wheel 74 which cooperates with the fixed central wheel 78 and the wheels 71, the latter undergoes only a translating movement, i. e., any straight line located on wheel 71, or on the intermediate recorder which is integral with this wheel, will always remain parallel to itself during the rotation of the disc 72. Any point such as 83 of the arrangement mounted on the wheel 71 will thus describe an arc 84, this particular arc having a center identical to that of the fixed wheel 78.

It will thus be desirable to choose the diameter of the wheels 78 and 71 as large as possible in order to ensure a rigid mounting of the intermediate recorder on wheel 71, so that the recording bars 62 will always remain vertically. Also, in order to avoid excessively fast rotation of the planetary wheels 74, their diameter will be chosen as large as possible taking into account the available space. As is shown on Fig. 2, the diameter of wheels 74 is substantially equal to that of wheels 78 and 71, which is possible while keeping suitable spaces between wheels 78 and 71 on the one hand, and wheels 74 and 71' cooperating with the rotation of two distinct intermediate recorders.

The rotation of wheel 80 which carries disc 72 is controlled by gear wheel 85 and by means of gear wheel 86. As is shown in Fig. 1, gear wheel 86 which couples gear wheels 85 and 80 is fixed on the vertical wall 1 by means of bolts such as 87 and bearings such as 88. Wheel 85 is fixed in the same manner (bolt 89) and it is integral with a shaft 90 which traverses the whole frame and which is also supported by means of the opposite vertical wall 1' by bolt 91. The bevelled gear wheel 92 located outside the vertical wall 1' is made integral with shaft 90 by means of a bolt 93 and this wheel constitutes the motor pinion which will be driven by motor M through the linkage mechanism L, leading thereby to the rotation of shaft 90 and consequently the rotation of wheels 85 and 86 driving the translating mechanism of the intermediate recorders. The motor M through the linkage L' will also cause the advancement of the conveyor which causes the displacement of the main code recorders such as 94 (Fig. 4). The wheel 85 and the conveyor C which carries the main code recorders 94 . . . 94$^{n'}$ may be driven by a common prime mover M coupled by a suitable linkage L as shown schematically in Fig. 2.

It will be noted, particularly by examining Fig. 3, that the rotating device of the intermediate selectors with epicyclic gear train and the motor arrangement are only necessary at one side of the intermediate selectors. Indeed, the vertical plate 1' only supports one axle 81' mounted on bearings in the same way as axle 81, so as to be able to support disc 72', but this disc has no gears such as the gear wheel 80 integral with disc 72. Disc 72' only serves to support the intermediate recorders by means of bolts 73' and the bearings 75' fixing them in notches of the circumference of disc 72' just in the same manner as the arrangement on the left-hand side of the figure.

Returning to Fig. 2, it will be seen that the recording bars 62 are provided with a shoulder piece 95 which comes to abut against the inner face of the frame 65 under the action of a restoring spring 96 fixed on the one hand to frame 65 in 97 and on the other hand to a projection 98 on the recording bar.

As is shown particularly on Fig. 4, when bar 62 of the upper intermediate recorder comes into contact with lever 43 in the operated position, the latter will pivot in an anti-clockwise direction and against the action of its restoring spring 45, whereas the recording bar 62 will be depressed until the maintaining dog 99 which is common to the twenty-two bars of an intermediate recorder latches above the tooth 100 of bar 62 to ensure its maintenance in the operated position. This operation is due to the action of a restoring spring 106 which pushes dog 99 against bars 62, the dog pivoting around the pivot 107.

Figure 5:
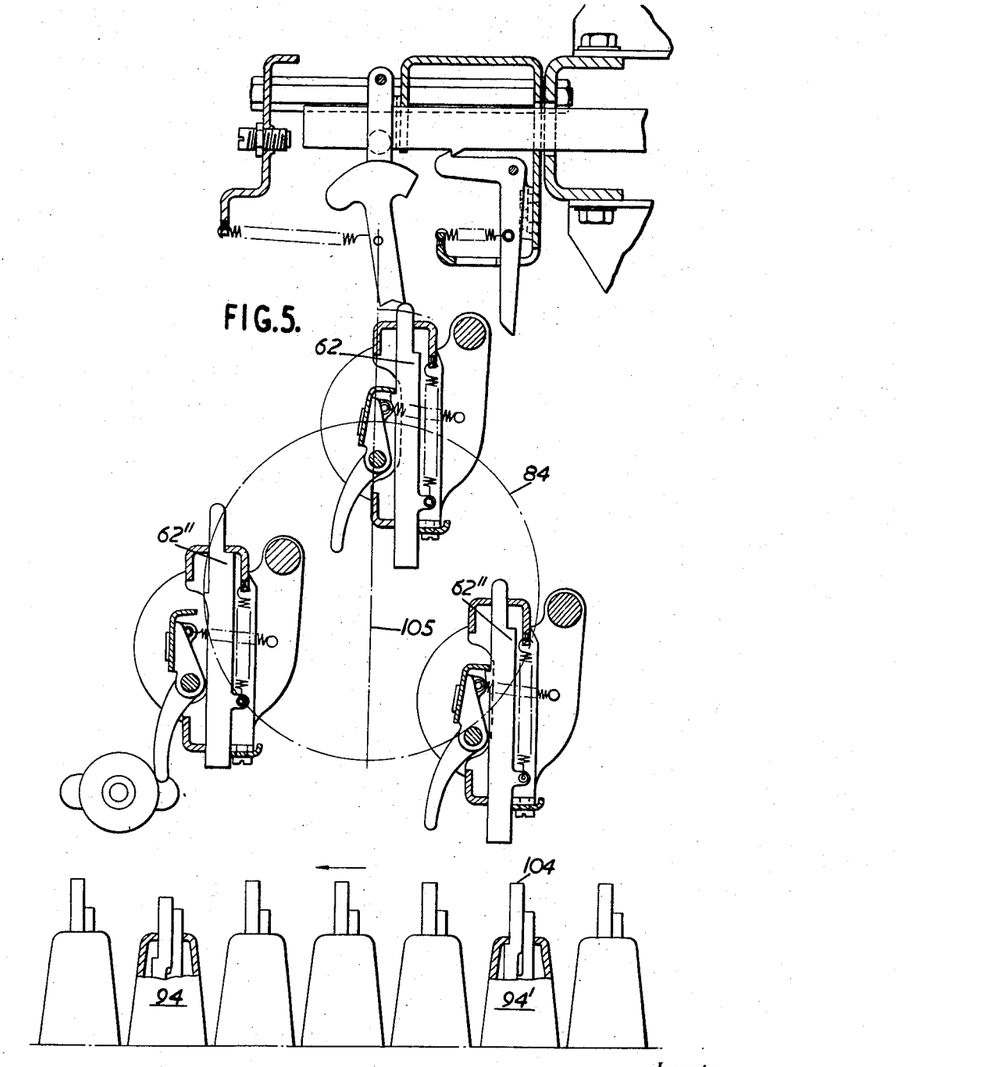
Fig. 5 represents a view corresponding to that of Fig. 4 but showing an intermediate recorder which has just been actuated by the fixed mechanism and another intermediate recorder previously operated and which has just been actuated by a fixed abutment to cause its release.

The depressed position of bar 62 is indicated on Fig. 5 at the moment when its upper end is ready to disengage itself from notch 61 of lever 43. This same figure shows the intermediate recorder at the extreme left, and of which the shown bar 62' had been previously operated (Fig. 4). The extension 101' of dog 100' of this recorder comes to abut against roller 102 fixed in an opening 103 of the vertical wall 1. This meeting causes the lifting of bar 62' under the action of its restoring spring 96'.

Figure 6:
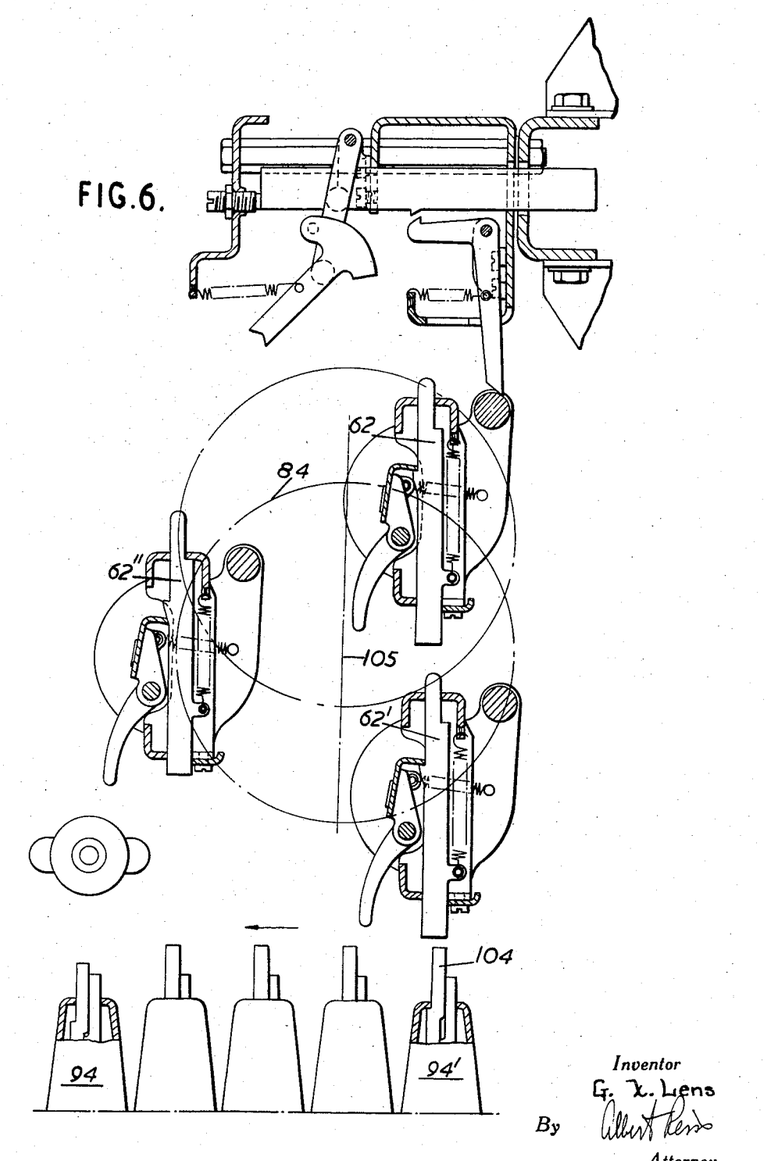
Fig. 6 represents the same view as that of Fig. 4 but shows an intermediate selector which, after having been operated, will restore the fixed mechanism to its inoperated position and another operated intermediate selector approaching a main selector which it will actuate.

Fig. 6 shows that when the depressed bar 62 of the upper intermediate recorder has disengaged itself from lever 43, the latter returns to its initial operated position (Fig. 4) under the action of its restoring spring 45, the control bar 25 returning immediately afterwards to its normal position. This is effected by means of the tubular crosspiece 69 at the moment it meets dog 52 to make it pivot, disengaging in this way the control bar 25 which is restored to the left under the action of spring 45.

On Fig. 6, it is seen that the lower intermediate recorder is ready to meet the main recorder 94'. The lower end 62a of the bar 62 comes into contact with the upper end of the recording bar 104 of the main recorder 94 of the main recorder when bar 62 is still slightly to the right of the line 105. From this moment on, the recording bar 104 of the main recorder 94' will be depressed to reach the position shown in Fig. 7.

Figure 7:
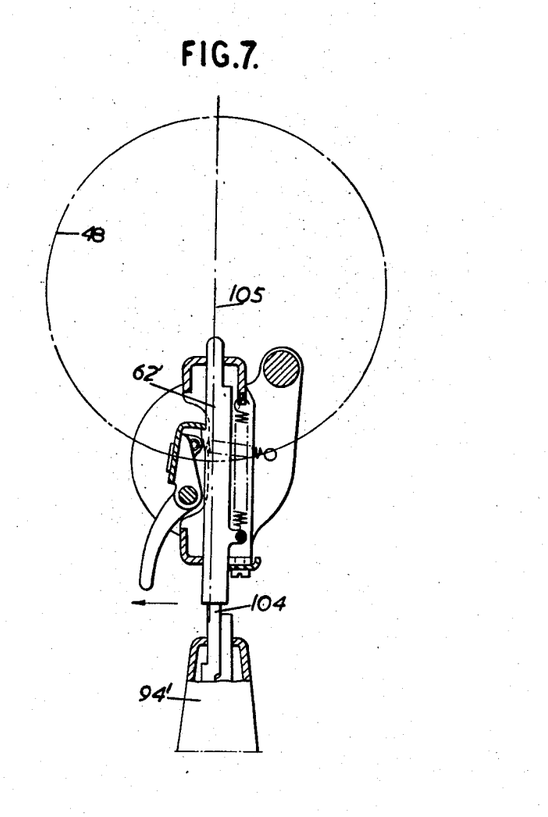
Fig. 7, similar to the previous one, represents an intermediate selector which has just actuated a main selector.

In this position the recording bar 104 is completely depressed and if need be, it is automatically retained in this operated position by means of a device such as described in my said copending application.

The intermediate memory device described above has the advantage of a great simplicity of operation. Indeed, it is sufficient for the operator to depress the keyboard keys (not shown) corresponding to the chosen combination, for four electromagnets 11, 11' corresponding to the combination to be energized, thus placing four corresponding levers 43 in an operated position independently of the subsequent condition of the electromagnets. On the other hand, as is clearly shown in Figs. 5 and 6, as soon as the intermediate recording bars have been set, the maintaining dogs of the fixed mechanism are displaced to restore the latter to its normal position. Immediately thereafter, the operator can again depress a set of keys in order to impress a new combination. It is sufficient that the short dead time preceding the moment when the dogs such as 52 are operated, should be indicated visually or acoustically to the operator, in order that the latter may work at the rhythm of the machine. To this effect, this dead time starting with the meeting of levers 43 and bars 62, and closing with the release operation of dogs 52, can correspond, in case of a letter-sorting machine such as described in my U. S. Patent No. 2,689,657, to the moment when the letter which passes in front of the operator stops or temporarily reduces its speed in its displacement toward the sorting machine. An interrupted movement can be provided so that the letter remains substantially motionless in front of the operator during a small part of the sorting period which can be of one second, to quickly start again afterwards. This will indicate to the operator who has had the opportunity to determine the destination code of the letter, that he should depress the corresponding keys. From that moment on, there still remains a suitable time to the operator to depress the keys because the intermediate recorder which is going to receive the code, still has to accomplish almost a third of the rotation before meeting levers 42 of which the operator will cause the operation. Of course, each delay on the part of the operator for the depression of keys will be to the detriment of the time allocated to him to read the following letter, but nevertheless the system is extremely flexible and the operator has the possibility to use practically a whole sorting period to determine the depressed keys and to depress them.

The rotation speed of the intermediate recorders will be directed proportional to the speed of advancement of the main recorders and they may be driven by a common prime mover (not shown) through suitable transmission belt or chain (not shown). Moreover, the rotation speed will be inversely proportional to the distance separating two main recorders such as 94 and 94' which are temporarily allocated to the same operator's position. In the present case, as indicated on the figures, this distance corresponds to four times the distance between two adjacent main recorders, the number of operators' positions envisaged being four. In this way, the synchronization is ensured between the auxiliary recorders and those of the main recorders with which they have to cooperate.

It is preferable to choose the number of intermediate recorders as large as possible because this permits the reduction of the speed of rotation and consequently, the reduction of wear of these devices coming into contact with the fixed mechanisms, as well as the wear of the latter. Moreover, the higher the number of auxiliary recorders, the lesser their wear, because they share the work. This is important because these auxiliary recorders are subjected to more severe working conditions than the main recorders, the cycle of which has a much greater period than the period of the cycle of the auxiliary recorders. Indeed, the number of main recorders depends principally on the number of destinations of the sorting machine and consequently, their rotation cycle can be of the order of several minutes whereas the cycle of an auxiliary recorder, even when three are provided per operator's position, is only of a few seconds' duration.

Of course, there is a limit to the maximum number of auxiliary recorders which depends on their size and also on the radius of the circumference 84 which is the same for any point of an intermediate recorder. It will also be remarked that an odd number of intermediate recorders avoids a vertical superposition of these during the rotation, and consequently, three intermediate recorders arranged at 120° intervals from one another constitute an adequate solution.

The abovementioned radius will determine the tangential speed of an auxiliary recorder as a function of the angular speed. In principle, the resultant of this tangential speed in the direction of advancement of the main recorders must be substantially equal to the speed of the latter in order to avoid friction and produce only the depression of the recording bar 104. However, for a recorder 94 of the type described in my said copending application, there is a particular problem. Indeed, the recording bar 104 and the selecting bar 108 which is contiguous to it, can both slide through the slots 109 made in the upper portion frame 110. At their opposite ends, (not shown) these bars can also slide into similar slots in the lower portion (not shown) of frame 110 but which are open in the direction of arrow 111. This will later permit the release of the bars due to a slight tilting movement in their plane, the upper slot 109 being to this effect slightly wider (not shown) than the sum of widths of bars 104 and 108. Consequently, at the moment of "printing" a tangential frictional force could be produced tending to displace the top of bar 104 towards the left and consequently, the subsequent holding of the depressed bar would not be ensured after the disengagement of bar 62. In order to remedy this possible danger, the length of the circumference of rotation of the intermediate recorders divided by the number of intermediate recorders, will be chosen slightly smaller than the distance between two main recorders temporarily allocated to the same operator. This will give a slight difference of speed of advancement between the bars 62 and 104 at the moment when they meet, bar 104 going slightly faster. The slight friction produced will push the upper end of bar 104 in the direction of the arrow 111 avoiding in that way any tilting movement.

Various modifications of the invention are of course possible. For instance, instead of using bar 69 of the intermediate recorders to cause the release of control bars 25, a common single bar can be envisaged pivotable on the fixed frame and which will undergo a slight rotation due to a projection situated on disc 72 in order to swing the dogs such as 52 at the right moment.

While the principles of the invention have been described above in connection with specific apparatus, it is to be clearly understood that this description is made only by way of example and not as a limitation to the scope of my invention as set forth in the objects thereof and in the accompanying claims.

What is claimed is:

1. Indexing mechanism for setting mechanical code recorders of the type mounted on a movable conveyor comprising means for receiving coded information relative to controlling functions of said recorders, a plurality of movable intermediate code recorders, means for moving said intermediate recorders between said code receiving means and said first mentioned recorders in synchronism with said conveyor, means under control of said receiving means for transferring said received coded information to one of said intermediate recorders for temporary storage, and means for transferring to a predetermined one of said first mentioned recorders the coded information stored in said one intermediate recorder indicative of the function to be performed thereby.

2. Indexing mechanism as claimed in claim 1, wherein said means for receiving coded information comprises a first fixed frame, a plurality of movable code control bars mounted on said frame, each bar corresponding to a code element, a plurality of electromagnetic devices, each one coupled to a different one of said control bars, each device adapted, when energized, to actuate its associated control bar, and latch means for latching any actuated of said control bars in the actuated position.

3. Indexing mechanism as claimed in claim 2, wherein each of said first mentioned mechanical code recorders comprises a second frame having a plurality of parallel recording bars extending in a row perpendicular to the direction of movement of said conveyor, there being a recording bar corresponding to each of said code control bars and situated in the same plane thereas, each of said intermediate records comprising a third frame, a plurality of additional recording bars movably mounted in said third frame, there being an additional recording bar corresponding to each of said code control bars and situated in the same plane thereas.

4. Indexing mechanism as claimed in claim 3, wherein each of said code control bars comprises means for co-acting with a corresponding additional recording bar to actuate same when said control bar is actuated.

5. Indexing mechanism as claimed in claim 4, wherein each of said intermediate recorders further comprises re-set means attached to said third frame, said re-set means positioned to release said latch means after actuation of said additional recording bars.

6. Indexing mechanism as claimed in claim 5, wherein each of said intermediate recorders further comprises additional latch means for latching actuated of said additional recording bars, and fixed means for releasing said additional latching means after transfer to a recording bar of the coded information stored in an intermediate recorder.

7. Indexing mechanism as claimed in claim 6, wherein each of said intermediate recorders is spacedly mounted on a rotatable element and is adapted to revolve continuously while remaining in a fixed angular position corresponding to the angular position of said mechanical code recorders in said conveyor.

8. Indexing mechanism as claimed in claim 7, wherein the actuated additional recording bars of an intermediate recorder are positioned to come into tangential contact with corresponding recording bars of said predetermined mechanical code recorder whereby to displace said corresponding bars to their operated position.

9. Indexing mechanism as claimed in claim 8, wherein said means for moving said intermediate recorders comprises conveyor motive means, a fixed central wheel, a planetary gear wheel for each of said intermediate recorders, each in mesh with said central wheel at equi-spaced angular positions about the periphery thereof, a third gear wheel said planetary wheels rotatably attached to said third wheel at equi-spaced angular positions therearound, and gear means coupled between said conveyor motive means and said third wheel.

References Cited in the file of this patent

UNITED STATES PATENTS 2,670,087    Stehlik _______________ Feb. 23, 1954